United States Patent
Mosier et al.

(10) Patent No.: US 8,887,142 B2
(45) Date of Patent: Nov. 11, 2014

(54) LOOP CONTROL FLOW DIVERSION

(75) Inventors: Scott Mosier, North Bend, WA (US); Michael McKenzie Magruder, Carnation, WA (US); Frank V. Peschel-Gallee, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1128 days.

(21) Appl. No.: 12/720,788

(22) Filed: Mar. 10, 2010

(65) Prior Publication Data
US 2011/0225213 A1 Sep. 15, 2011

(51) Int. Cl.
G06F 9/44 (2006.01)
G06F 9/38 (2006.01)
G06F 9/32 (2006.01)

(52) U.S. Cl.
CPC ............ *G06F 9/32* (2013.01); *G06F 9/3851* (2013.01); *G06F 9/325* (2013.01); *G06F 9/44* (2013.01)
USPC .......................................... 717/159; 717/160

(58) Field of Classification Search
USPC .................................. 717/159–160
See application file for complete search history.

(56) References Cited

U.S. PATENT DOCUMENTS

| | | | |
|---|---|---|---|
| 5,842,016 A | 11/1998 | Toutonghi et al. | |
| 6,151,703 A | 11/2000 | Crelier | |
| 6,178,499 B1 * | 1/2001 | Stotzer et al. ................ | 712/241 |
| 6,851,109 B1 | 2/2005 | Alexander, III et al. | |
| 6,993,754 B2 | 1/2006 | Freudenberger et al. | |
| 2002/0032719 A1 * | 3/2002 | Thomas et al. ............... | 709/107 |
| 2002/0112227 A1 | 8/2002 | Kramskoy et al. | |
| 2004/0205712 A1 | 10/2004 | Holzle et al. | |
| 2007/0203960 A1 | 8/2007 | Guo | |
| 2008/0189692 A1 | 8/2008 | Inglis et al. | |
| 2009/0055814 A1 | 2/2009 | Gallop et al. | |
| 2009/0064113 A1 | 3/2009 | Langman et al. | |
| 2009/0172263 A1 * | 7/2009 | Olbrich et al. ................ | 711/103 |
| 2010/0122066 A1 * | 5/2010 | Fischer ......................... | 712/205 |

FOREIGN PATENT DOCUMENTS

CN 101373427 A 2/2009

OTHER PUBLICATIONS

Agesen, Ole, "GC Points in a Threaded Environment", Retrieved at <<http://research.sun.com/techrep/1998/smli_tr-98-70.pdf>>, Technical Report, Dec. 1998, p. 23.
Richter, Jeffrey, "Garbage Collection Part 2: Automatic Memory Management in the Microsoft .NET Framework", Retrieved at <<http://msdn.microsoft.com/en-us/magazine/bb985011.aspx>> Dec. 2000, pp. 8.
Broman, David, "Profiler Stack Walking in the .NET Framework 2.0: Basics and Beyond", Retrieved at <<http://msdn.microsoft.com/en-us/library/bb264782.aspx>> Sep. 2006, pp. 10.
"Office Action Received for Chinese Patent Application No. 201110065876.0", Mailed Date: Aug. 11, 2014, 13 Pages.

\* cited by examiner

*Primary Examiner* — Li B Zhen
*Assistant Examiner* — Duy Khuong Nguyen
(74) *Attorney, Agent, or Firm* — Kevin Sullivan; Kate Drakos; Micky Minhas

(57) ABSTRACT

Loop control flow diversion supports thread synchronization, garbage collection, and other situations involving suspension of long-running loops. Divertible loops have a loop body, a loop top, an indirection cell containing a loop top address, and a loop jump instruction sequence which references the indirection cell. In normal execution, control flows through the indirection cell to the loop top. After the indirection cell is altered, however, execution flow is diverted to a point away from the loop top. Operations such as garbage collection are performed while the loop (and hence the thread(s) using the loop) is thus diverted. The kernel or another thread then restores the loop top address into the indirection cell, and execution flow again continues through the restored indirection cell to the loop top.

20 Claims, 3 Drawing Sheets

NORMAL EXECUTION

DIVERTED ("HIJACKED") LOOP

LOOP CONTROL FLOW DIVERSION

BACKGROUND

Within software, control flow mechanisms help specify the order in which individual statements, instructions, calls, and other items are executed or evaluated. At the source code level, and sometimes at lower levels, different programming languages and different run-time environments may provide different control flow mechanisms.

At the level of machine or assembly language, control flow instructions often work by altering the program counter. Within source code, a given language may provide control flow statements which: continue execution at a location other than the following statement (e.g., unconditional branch, jump, goto); execute specified statements only if some condition is met (e.g., conditional branch); execute specified statements zero or more times depending on some specified condition (e.g., loop); execute a set of distant statements and then return to pick up where it left off (e.g., routines, functions, methods, coroutines); and/or unconditionally halt execution.

In many cases, the effects of a given control flow mechanism on a program's data can be obtained using any of several equivalent control flow mechanisms. Routine bodies may be inlined, for example, without changing the program's behavior as to data outputs for given inputs (although execution speed and/or memory requirements may change). Likewise, loops having an exit condition in the middle or at the end of a loop body can have functionally equivalent instruction sequences whose exit condition is tested at the top of a loop body. Control flow structures which have one entry and one exit are often easier to understand than those which do not, because (conceptually at least) such structures can be used anywhere in a program as a single statement without complicating the control flow. Such control flow structures are called "composable". Many loops are composable structures, for example.

SUMMARY

In some computational situations, it is helpful or even necessary to pause some or all program threads synchronously. For example, synchronizing threads may be part of garbage collection (reclaiming unused memory), part of timely execution of high priority code in real-time systems, and/or part of a process synchronization which allows processes to reach agreement or commit to a particular course of action. However, some threads include long-running loops, such as loops without routine calls, and some approaches to synchronizing such threads insert program state annotations or global state checks that complicate program code and degrade execution performance.

Some embodiments discussed herein provide alternative approaches to loop control flow diversion for thread synchronization or other purposes. For example, assume an executable module managed by a virtual execution system or other kernel includes a loop having a loop body and a loop top. An indirection cell contains a loop top address, namely, an address pointing to the loop top. A loop jump instruction sequence references the indirection cell. In this context, a first thread executes an iteration of the loop body. Execution loads the address contained in the indirection cell, and continues execution flow of the first thread through the address specified in the indirection cell to the loop top. A second thread of execution alters the content of the indirection cell such that the indirection cell contains an address other than the loop top address, e.g. a kernel synchronization routine address; this alteration may be performed atomically. Regardless, execution flow of the first thread is diverted through the altered indirection cell to a point away from the loop top. Synchronization operations such as garbage collection are performed while the loop (and hence the thread(s) using the loop) are thus diverted. The kernel or another thread then restores the loop top address into the indirection cell, and execution flow of the first thread again continues, through the restored indirection cell, to the loop top.

Loop diversion can be performed without restricting which registers remain valid across successive transitions from the loop body bottom to the loop top. In some variations, multiple loops and/or multiple threads are diverted. Operating system support for forcibly modifying one thread's execution context from another thread is not necessarily available or utilized.

In some embodiments, a code generator provides a loop having a loop body and a loop top. The code generator associates an indirection cell with the loop top, such that a loop jump instruction sequence includes a jump to an address contained in the indirection cell. The code generator also designates an original value storage location which is sized to hold a representation of the loop top address, that is, either the address itself or an encoded version of the address such as a compressed version. The code generator emits redirection target code which upon execution will prepare an identifier corresponding to a respective indirection cell and pass control to a redirection processing routine. In short, the code generator generates code which operates to effect loop control flow diversion, as discussed. The code generator, and/or such generated code, may reside in a memory of a computer system, in operable communication with logical processor(s) of the system.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
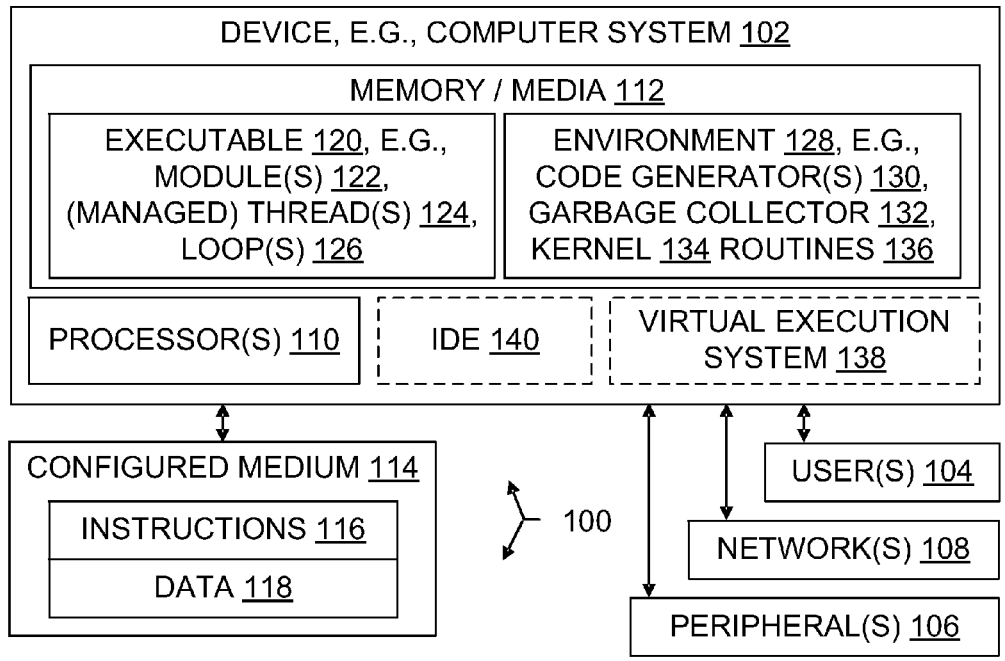
FIG. 1 is a block diagram illustrating a computer system having at least one processor, at least one memory, an executable including at least one loop, a kernel, and other items in an operating environment which may be present on multiple network nodes, and also illustrating configured storage medium embodiments.

In order to execute some system tasks, such as garbage collection, a virtual execution system may need to pause all program threads synchronously. In order to pause a long-running thread (e.g., a loop without calls) in a timely manner, compilers may insert program state annotations (such as variable liveness information) or global state checks into program code. However, this extra information and logic tends to complicate program code and degrade its execution performance.

One approach to pausing long-running threads is so-called fully interruptible code, e.g., as implemented by the Microsoft® .NET runtime (Microsoft and ".NET" are marks of Microsoft Corporation). A program method containing a loop without calls is annotated with information describing the liveness of garbage collection pointers at every single machine instruction in the method. This annotation allows the virtual execution system to forcibly suspend a thread running this code at any point in the method and redirect its execution to a safe point. However, this is only possible if the operating system supports certain thread state management functionality, such as the ability for one thread to forcibly change the context of another thread.

Another approach to pausing long-running threads includes state checks inserted into long-running loops, e.g., as implemented by Microsoft Silverlight® solutions for Mac OS® software (Silverlight is a mark of Microsoft Corporation; Mac OS is a mark of Apple, Inc.). This approach is used on some operating systems such as Mac OS which lack the support required for fully interruptible code. However, this approach involves adding extra code to the loops to explicitly check for the need to synchronize with the garbage collector.

Some embodiments described herein provide a different approach. In some embodiments, for example, a virtual execution system (VES) uses a standard technique known as return address hijacking (redirecting the return address) to gain control of program threads at call return sites and uses loop control flow diversion techniques described herein to gain control of program threads executing long-running loops that lack calls. With loop diversion, long-running loop code generation is changed to make control flow go through an indirection cell when control jumps back to the beginning of the loop body. At runtime, when the garbage collector (for instance) requires threads to stop, the VES modifies the contents of this indirection cell to point to a loop-specific assembly thunk which will ultimately cause the thread to rendezvous with the garbage collector on the next iteration of the loop.

More generally, aspects of loop diversion provided herein include use of an indirection cell as a mechanism for hijacking—through loop diversion—a thread managed by a VES, providing an implementation approach in which only one additional point in the program per candidate loop requires garbage collector liveness information. The indirection cell is written by another VES thread as part of the mechanism to gain control of the thread in a loop. On x86-like processor architectures where an indirect jump instruction exists, all registers can remain available to the code generator for the body of the loop code. The loop diversion approach described is portable to all major operating systems known to the inventors, since specific operating system support for forcibly imposing thread context changes is not required for loop diversion. Other aspects of loop diversion are described below.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit. For example a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" herein include virtual execution systems, operating systems, hypervisors, virtual machines, and similar hardware interface software.

"Code" means processor instructions, data (which includes constants, variables, and data structures), or both instructions and data.

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine.

Throughout this document, use of the optional plural "(s)" means that one or more of the indicated feature is present. For example, "loop(s)" means "one or more loops" or equivalently "at least one loop".

Whenever reference is made to data or instructions, it is understood that these items configure a computer-readable memory thereby transforming it to a particular article, as opposed to simply existing on paper, in a person's mind, or as a transitory signal on a wire, for example.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked.

Human users 104 may interact with the computer system 102 by using displays, keyboards, and other peripherals 106. System administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The storage media 112 may be volatile memory, non-volatile memory, fixed in place media, removable media, magnetic media, and/or optical media (as opposed to propagated signal media). In particular, a configured storage medium 114 such as a CD, DVD, memory stick, or other removable non-volatile memory medium may become functionally part of the computer system when inserted or otherwise installed, making its content accessible for use by processor 110. The removable configured storage medium 114 is an example of a computer-readable storage medium 112. Some other examples of computer-readable storage media 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by as discussed herein, e.g., by alteration, indirection, diversion, restoration, binding, deployment, execution, modification, display, creation, loading, and/or other operations.

An executable 120 includes software application components, such as module(s) 122, thread(s) 124, and loop(s) 126. A development/runtime environment 128 also includes software development components, such as linker(s), binder(s), interpreter(s), compiler(s) and other code generator(s) 130, and includes software runtime component(s) such as garbage collector(s) 132 and kernel(s) 134 containing various low-level routine(s) 136. A virtual execution system 138, which provides an environment for executing managed code and supporting the Microsoft® Common Intermediate Language instruction set, is one example of a kernel. The classification as to whether a particular component is primarily or solely an application component, a development component, and/or a runtime component is merely for convenience of discussion; a given component may be classified differently by different users and/or in different situations.

A given operating environment 100 may include an Integrated Development Environment (IDE) 140 which provides a developer with a set of coordinated software development tools. In particular, some of the suitable operating environments for some embodiments include or help create a Microsoft® Visual Studio® development environment (marks of Microsoft Corporation) configured to support program development. Some suitable operating environments include Java® environments (mark of Sun Microsystems, Inc.), and some include environments which utilize languages such as C++ or C#("C-Sharp"), but teachings herein are applicable with a wide variety of programming languages, programming models, and programs, as well as with endeavors outside the field of software development per se that use threads, long-running loops (loops lacking calls in their bodies), or both.

Software components and other items shown in the Figures may reside partially or entirely within one or more media 112, thereby configuring those media. In addition to memory and processor(s), an operating environment may also include other hardware, such as buses, power supplies, and accelerators, for instance.

Some items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
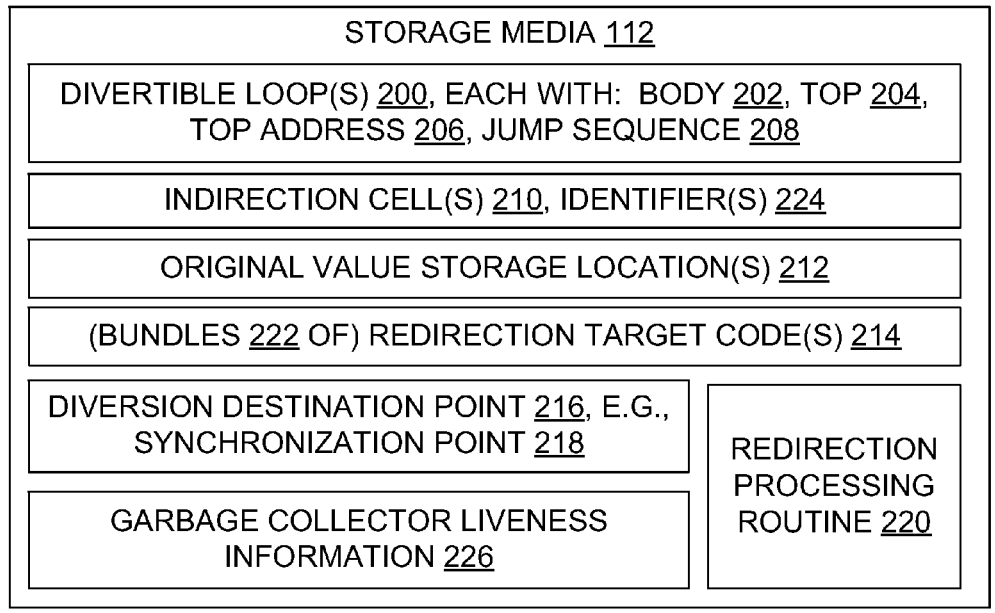
FIG. 2 is a block diagram illustrating indirection cells, original value storage locations, and other loop diversion items in an example architecture.

FIG. 2 illustrates an architecture which is suitable for use with some embodiments. Familiar loops 126 are made into divertible loops 200 as discussed herein. Each divertible loop 200 has a body 202, a top 204, a top address 206, and a jump sequence 208. The loop body 202 includes one or more statements or instructions; a statement may be implemented with one or more instructions. The loop top 204 may be the first statement/instruction of the loop body, or the loop top may be a test performed right before control passes to the loop body. The loop top address 206 is the memory address of the loop top 204, that is, a value which points the processor 110 to the loop top during execution. The jump sequence 208 instructs the processor to jump toward the loop top. In standard loops, a jump sequence points directly to a loop top. But in divertible loops, the jump sequence 208 points to an indirection cell 210, which in turn points either to the loop top 204 (normal execution) or to another point (diverted execution) as discussed below.

More generally, as used herein, "loop" includes loops that are laid out with the following syntactic instruction sequence format; optional items appear in brackets:

```
[sequence of instruction(s)/statement(s)]
<top> [test] instruction/statement
       [additional instruction(s)/statement(s)]
[test]  <jump sequence>
```

As used herein, "loop" also includes loops that are given as pseudocode or diagrammatic examples herein, and loops that are functionally equivalent to loops having the syntactic instruction sequence format above and/or functionally equivalent to any of the pseudocode or diagrammatic examples given herein. Although terms such as "top" and "back" are sometimes used herein, in general the direction of the jump taken to/through the indirection cell 210 is not limited to jumps backward or to jumps to a location at the top of a sequence of instructions. Divertible loops can be implemented with jumps in other directions.

By way of some pseudocode examples of loops, and without excluding other examples of non-sequential code sequences which can be diverted using indirection cells 210 and other mechanisms provided herein, each of the following represents a loop which could be divertible as discussed herein:

```
FOR I = 1 TO N BY K DO
   Statement(s)
END
WHILE Test DO
   Statement(s)
END
REPEAT
   Statement(s)
UNTIL Test
FOREACH (Item in Collection) DO
   Statement(s)
END
Label: Statement(s)
   JUMP TO Label
LOOP
   [Statement(s)]
   EXIT / BREAK
   [Statement(s)]
END
```

In a given embodiment, the processor 110 may have a load/store architecture, a Complex Instruction Set Computer architecture, or some other architecture. In particular, terms such as "references" and "instruction sequence" as used herein do not preclude a load being separated from a branch when executing a loop.

When a divertible loop 200 is diverted, the content of the indirection cell 210 is altered. The original content of the cell 210, namely, the loop top address 206, has been previously saved in an original value storage location 212, possibly in encoded form. The indirection cell 210 is made to point instead to a redirection target code 214 which notes the alteration using identifier(s) 224 and then passes control to a diversion destination point 216, such as a synchronization point 218 where threads 124 are synchronized with a kernel 134. At the diversion destination point, control may be given to a redirection processing routine 220, such as a kernel garbage collection 132 routine 136, based on garbage collector liveness information 226. The redirection processing routine 220 restores the original addresses into the indirection cell(s) 210 from the storage location(s) 212, and normal loop execution is allowed to resume. Redirection target codes 214 may be arranged in bundles 222 to reduce code size.

With reference to FIGS. 1 and 2, some embodiments provide a computer system 102 with a logical processor 110 and a memory medium 112 configured by circuitry, firmware, and/or software to transform loop structures by installing indirection cells and other control flow diversion functionality as described herein. The mechanism can be used with an arbitrary finite number of loop(s) and an arbitrary finite number of thread(s).

For example, one embodiment that relates to the structure of the generated code includes a computer system 102 with a logical processor 110, and a memory in operable communication with the logical processor. An executable module 122 resides in the memory, and thus configures it. The executable module includes a plurality of loops 200, each having a respective loop body 202 and a respective loop top 204. The module 122 also includes a plurality of indirection cells 210, each containing at some point a respective loop top address 206, namely, an address pointing to a respective loop top 204. Each loop 200 also includes a respective loop jump instruction sequence 208 that includes a jump to an address contained in the respective indirection cell 210. A plurality of respective original value storage locations 212 are also in the system. Each original value storage location 212 is sized to hold a representation of the respective loop top address 206. The representation may be an encoding (e.g., compressed version) of the address, or it may be the unencoded address. The system also includes a plurality of respective redirection target codes 214, each of which upon execution will pass control to a single shared redirection processing routine 220. That is, all the redirection target codes pass control to the same redirection processing routine 220. For instance, all loop diversions could lead to the same garbage collector 132.

In some embodiments, the loop control diversion is transparent to the loop, providing a result resembling a thread suspension. The code for the loop can be generated as if the indirection cell 210 always points to the original (loop top) address. As a consequence the redirection target code 214 and/or redirection processing routine 220 that control is diverted to re-establishes the processor state (execution register values) to the previous state (or the semantic equivalent of it), and saves the processor state in a manner that allows the VES or other kernel to reconstruct the thread's state at the point of diversion. Thus, some embodiments include code which upon execution will track/note for the virtual execution system 138 which indirection cells 210 have been modified. In some embodiments, the virtual execution system 138 tracks which indirection cells have been modified. For example, indirection cell modification tracking may be done by a virtual execution system 138 thread that is attempting to gain control of other threads.

In some embodiments, threads relate to execution, as opposed to the structure of code in memory, in the sense that the structure of the generated code does not control how many threads may be executing that code. Threads 124 and loops 200 are not necessarily in a 1-to-1 mapping. Each thread may be in the process of executing zero or more loops, and each loop may be executing on zero or more threads. Diversion mechanisms discussed herein can be used with an arbitrary number of threads, and with an arbitrary number of loops.

In some embodiments, loop diversion includes synchronizing thread(s) 124 with a kernel 134 in the absence of fully interruptible loop code. That is, the VES doesn't have enough information to establish the thread's full managed execution state at every instruction inside the loop. Instead, the VES only has enough information to establish a thread's full execution state while it is currently executing the "jump via indirection" instruction. Accordingly, in some embodiments, loop diversion includes synchronizing the thread with an entity controlling the execution environment at a location that allows the execution environment to establish a thread's full execution state.

This mechanism can be used to control/divert an arbitrary number of threads, including threads within a managed execution scope such as VES threads. In some embodiments, a virtual execution system 138 includes code which may employ a thread to modify indirection cells 210 and hence divert loops 200 of other threads to a redirection processing routine 220 specified by the virtual execution system.

In some embodiments, the redirection processing routine 220 includes code which upon execution will perform a garbage collection synchronization operation. However, loop diversion can also be performed for different, or additional, purposes than garbage collection, such as loop synchronization, pausing execution to examine and/or archive memory contents, collection of software usage telemetry, and so on.

In some embodiments, assembly/intermediate language thunks are examples of redirection target codes 214. Thunks may have a particularly compact structure of instruction sequences. One arrangement of thunks, designed as bundles 222 to maximize the use of small 'push imm8' and 'jmp rel8' instructions, is discussed at length below in connection with a section titled Additional Examples.

In some embodiments, the redirected target thunk itself loads an identifier 224 for the corresponding indirection cell 210, such as an indirection cell array index and a module ID. Then the thunk jumps to a common routine 220. This common routine may synchronize with the garbage collector 132, wait for the garbage collector to complete, and then use the indirection cell index to lookup the loop top address 206, and then jump to that address. It is the garbage collector code that will restore the indirection cells 210 themselves after consulting with a bitmap or other tracking structure to see which cells 210 it needs to restore original addresses in.

In some embodiments, code generation is split between two tools, namely, a compiler and a binder. The compiler produces the loop 126 with the loop body 202, and the binder modifies the loop 126 to create a divertible loop 200 having an indirected jump through the cell 210. The binder need not impose a requirement on the compiler's loop body code generation. That is, the loop redirection technique described can be transparent to the code generator 130 that is producing the loop body code. In some embodiments, neither the compiler nor the binder impose a loop alignment requirement, while in other embodiments loop alignment is enforced by an intermediate language code generator, by a binder, and/or by another tool.

In some embodiments, the code that restores the indirection cells 210 is inside the runtime, and so is not generated by the compiler as part of the application program. The compiler generates the redirection target code 214 which doesn't restore the indirection cell, but rather figures out where to jump back to (the loop top) for that particular thread.

Figure 4:
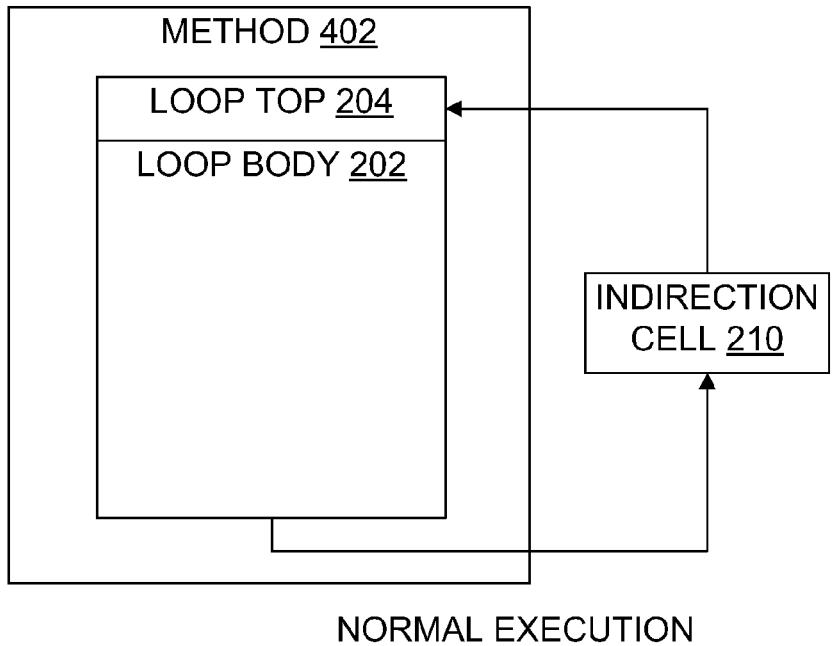
FIG. 4 is a control flow diagram illustrating normal loop execution, that is, execution in which a divertible loop is not diverted.
Figure 5:
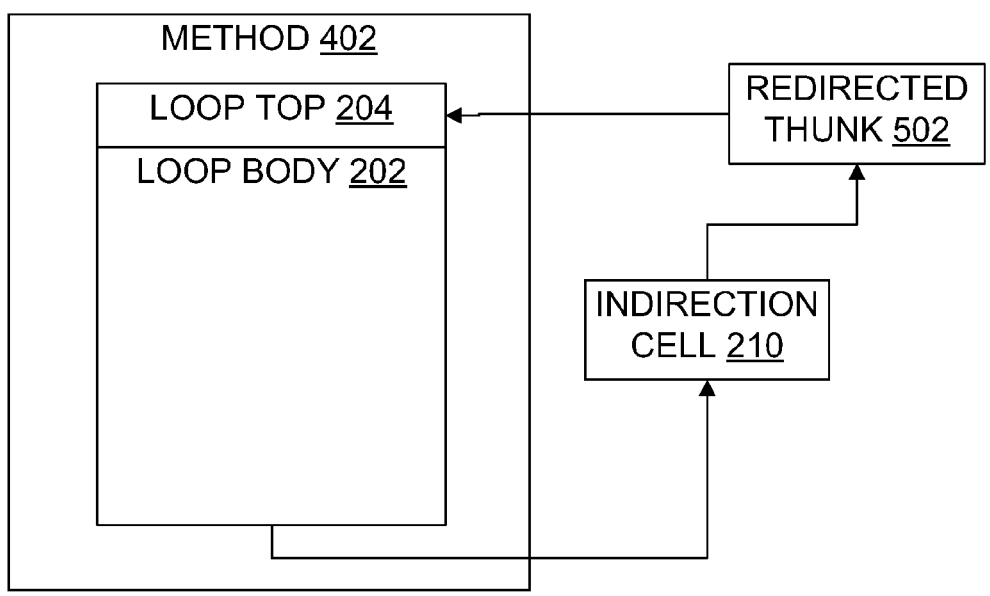
FIG. 5 is a control flow diagram illustrating "hijacked" loop execution, that is, execution in which a divertible loop has been diverted.

In some embodiments, including some which are consistent with FIGS. 4 and 5, the compiler generates a modified back-jump in method 402 loops that it identifies as potentially long-running. This modified back jump code generation loads an indirection cell 210 and jumps to the code address specified in the indirection cell. The x86 processor architecture has a single indirected-jump instruction that may be used for this purpose. These are the only changes to the body of code within the loop. These code changes are smaller than a "checking global state" solution, but larger than a "fully interruptible code" solution, which requires no loop body changes.

In these particular embodiments, the compiler emits garbage collector liveness information 226 for the loop target location, that is, the first instruction in the loop body. As a result, the loop's execution performance is affected very little by the additional code, but there is a significantly smaller amount of additional garbage collector liveness information required as compared to fully interruptible code (which affects the overall virtual execution system performance). Also, the code changes allow for the thread itself to run to the VES rendezvous, whereas fully interruptible code requires special operating system support to allow one thread to forcibly redirect another thread's execution. This makes fully interruptible code intractable on operating systems without this support.

In these particular embodiments, the compiler also emits an additional redirected target thunk 502 for each modified loop, which serves as the target address for the indirection cell when the VES is attempting to gain control of threads executing this code. This thunk 502, which is an example of redirection target code 214, will note which loop the original loop target address corresponds to and then rendezvous with the VES.

The VES is assumed to already be able to identify which method 402 a given thread 124 is executing in. Once it has ascertained that a given thread is executing in a method containing one or more of these loops, it alters the indirection cell(s) 210 associated with that method from pointing at their respective loop tops 204 to pointing at their respective redirected target thunks 502. The VES may alter the indirection cell(s) for just one loop 200, for all loops 200 in the method 402, or for all loops 200 in the module 122, for example, as it sees fit. In a fully interruptible solution the VES uses special operating system support to forcibly pause and modify another thread's context state. Such support is not available on all operating systems, e.g. Apple's Mac OS® operating system.

In these embodiments, the VES restores the original contents of all indirection cells that it may have altered, prior to resuming normal execution. The VES keeps track of which indirection cells it has altered during thread suspension and then uses these cells' indices to lookup their original values in a lookup table or other location 212 stored into the module by the compiler.

The redirected target thunks 502 push their corresponding loop index onto the stack and then jump to a common VES-supplied rendezvous routine 220. This rendezvous routine will save the thread's register state where the garbage collector 132 can find it and then wait for the garbage collector to complete. Prior to resuming execution, this routine 220 will look up the original loop target address (corresponding to the 'loop index' pushed by the thunk), restore the register state, and then jump back to the top of the loop body.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Processes

Figure 3:
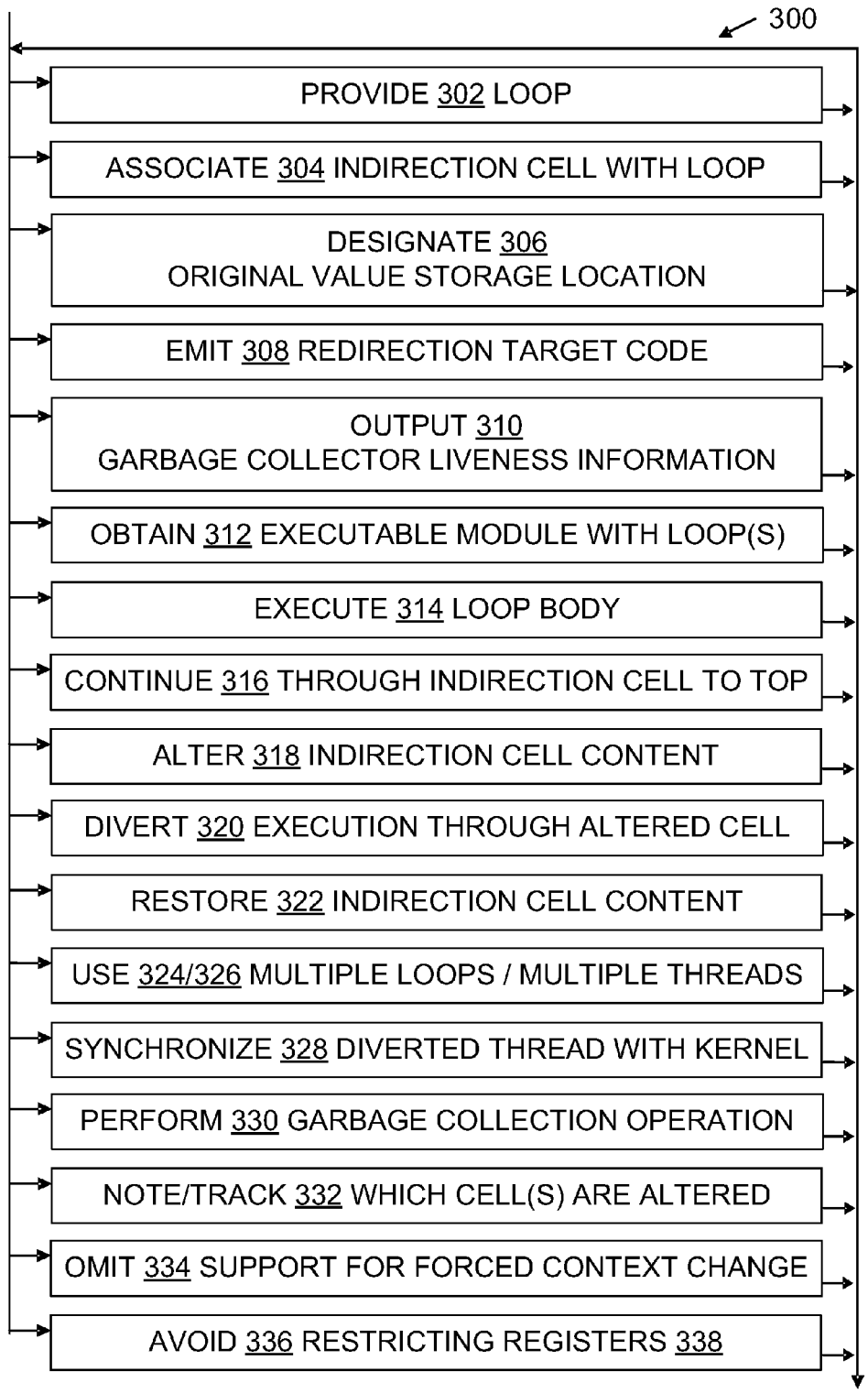
FIG. 3 is a flow chart illustrating steps of some process and configured storage medium embodiments.

FIG. 3 illustrates some process embodiments in a flowchart 300. Processes shown in the Figures may be performed in some embodiments automatically, e.g., by code generators 130, kernels 134, loops 200, and/or loop diversion mechanisms shown in FIGS. 1 and/or 2 under control of a script requiring little or no user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During a providing step 302, an embodiment provides a loop from which to form a divertible loop 200. For example, a loop 126 could be generated by a compiler, or a loop could be read from a network 108 connection or a local storage medium 112, to accomplish step 302.

During an associating step 304, an indirection cell 210 is associated by an embodiment with the loop provided during step 302. For example, after identifying a loop as long-running, a binder could modify a jump sequence 208 to pass control to a pointer which is initialized with the loop top address; the pointer serves as an indirection cell associated with the loop via the loop top address stored in the pointer. Association 304 may include allocating storage, e.g., within a module's data section, or within a runtime.

During a designating step 306, an embodiment designates a location 212 in which the original value (loop top address) of the associated indirection cell can be stored, to allow later reversion to normal execution after the loop is diverted. The storage location may be the same size as the indirection cell, or it may be smaller if the loop top address will be compressed. Designation 306 may include allocating storage, e.g., within a module's data section, or within a runtime.

During a code emitting step 308, an embodiment emits redirection target code 214. In particular, a code generator may emit 308 code 214 which upon execution will pass an indirection cell identifier 224 to a specified kernel routine 220, so the original value of the cell 210 can be recovered when normal execution of the loop is again desired.

During a garbage collection information outputting step 310, an embodiment outputs garbage collector 132 liveness information, e.g., in the loop top or in the redirection target code.

Before continuing a tour of the steps shown in FIG. 3, consider now the foregoing steps and their interrelationships in some embodiments that utilize them. Some embodiments provide a process for facilitating loop control flow diversion, performed by a code generator such as a compiler, a binder, or a combination of the two. The process includes providing 302 a loop having a loop body and a loop top, as discussed. An indirection cell 210 is associated 304 with the loop top, such that the loop's jump instruction sequence 208 includes a jump to an address contained in the indirection cell. An original value storage location 212 is designated 306, with a size appropriate to hold a representation of the loop top address. Redirection target code 214 is emitted 308 by the code generator. Upon execution, the redirection target code 214 will determine an identifier corresponding to a respective indirection cell and then pass control to a redirection processing routine 220.

In some embodiments, the code generator also outputs 310 familiar garbage collector liveness information 226, for the loop top.

Although some description above is in terms of one loop with one indirection cell, in some embodiments the code generator associates 304 a plurality of indirection cells with a plurality of respective loop tops, designates 306 a plurality of respective original value storage locations, and emits 308 a plurality of respective redirection target codes. In some embodiments, designating 306 an original value storage location which is sized to hold a representation of the loop top address involves the code generator designating an original value storage location 212 which is smaller than the indirection cell 210, for at least some of the loop top addresses, because the addresses will be compressed.

Returning to the tour of FIG. 3 steps, during an obtaining step 312, an embodiment obtains an executable module 122 containing divertible loop(s) 200, e.g., by receiving the module through a network link or loading it from local storage.

During a loop body executing step 314, the embodiment executes the body of a loop 200, that is, the loop body controls behavior of a processor 110.

During a continuing step 316, execution continues through an indirection cell 210 to the top 204 of the loop 200. Steps 314 and 316 help provide an example of normal execution of a divertible loop.

During an address altering step 318, the content of an indirection cell 210 associated with a loop 200 is altered such that the indirection cell no longer points to the top of that loop 200.

During a diverting step 320, execution is diverted by the altered 318 indirection cell to a location other than the loop top.

During a restoring step 322, indirection cell content is restored such that the indirection cell again points to the top of that loop 200.

Turning again from the tour of FIG. 3, the foregoing steps and their interrelationships are discussed in greater detail below, in connection with various embodiments. The remaining steps of FIG. 3 are also discussed.

Some embodiments provide a process for loop control flow diversion. The process utilizes a device which has at least one logical processor 110 in operable communication with at least one memory medium 112. The process includes obtaining 312 in the memory an executable module 122 which includes a loop 200 having a loop body 202 and a loop top 204. The module 122 also includes an indirection cell 210 containing a loop top address 206, namely, an address pointing to the loop top 204. The loop 200 also includes a loop jump instruction sequence 208 which references the indirection cell; as noted, a "reference" to an indirection can be accomplished with a variety of processor architectures.

After obtaining the module, the process includes a first thread 124 of execution executing 314 an iteration of the loop body. The address contained in the indirection cell is loaded in the processor 110 and execution flow continues 316 through the address specified in the indirection cell 210 to the loop top 204. Thus far, execution is normal, although control is subject to the indirection cell content, unlike a standard loop 126.

At some point, however, possibly after additional executions of the loop body, a second thread of execution alters 318 the contents of the indirection cell such that the indirection cell contains an address other than the loop top address. The indirection cell may be filled with the address of a separate redirection target code 214 for example, or the address of a redirection processing routine 220. The alteration diverts 320 execution flow of the first thread through the altered indirection cell to a point away from the loop top, referred to generally herein as a diversion destination point 216. A synchronization point 218 is an example of a diversion destination point 216, but as noted, diversion may be done for reasons other than synchronization. In some embodiments, the first thread and the second thread are each managed by a virtual execution system 138.

Subsequently, the redirection processing routine 220 restores 322 the loop top address into the indirection cell. Execution of the first thread continues 316 again through the restored indirection cell to the loop top; normal execution is thus resumed.

An embodiment may use 324 multiple loops 200, and/or use 326 multiple threads. In some embodiments, for example, one of the thread(s) executes multiple loops 200. The indirection cells are altered 318 to hijack all the loops, although it may be unknown which loop will be the one that actually sends the thread to the diversion destination point. That is, an embodiment sets all the indirection cells, one of them gets used by the thread, and then all of them are restored 322. In particular, assume the loop introduced above is a first loop 200, the first thread also executes a second loop 200, the second loop has a respective second loop body and a respective second loop top, the module also includes a second indirection cell containing a second loop top address pointing to the second loop top, and the second loop also includes a second loop jump instruction sequence which references the second indirection cell. The process diverts 320 execution flow of the first thread through an altered second indirection cell of one of the loops to a point away from that loop's top.

In some embodiments that use 326 multiple threads 124, all threads executing a loop 200 use the same indirection cell 210. That is, indirection cells are associated 304 on a per loop basis, not a per thread basis. Multiple threads execute the loop body, and the process diverts 320 execution flow of all threads that execute the loop body through the altered indirection cell to a point 216 away from the loop top.

In some embodiments which use 324 multiple loops, the memory includes a plurality (e.g., table, array, block) of indirection cells 210 allocated during code generation for a respective plurality of loops 200, and the process includes noting 332 which indirection cell(s) are altered 318. Noting altered cells allows more efficient restoration of original cell values in some embodiments, although restoring only altered cells is not necessarily the most efficient approach, as discussed below in connection with a bitmap and address groups.

In some embodiments, the step of altering 318 the indirection cell (such that the indirection cell contains an address other than the loop top address) is atomic with respect to all threads of execution in the device.

In some embodiments, the diverting step diverts 320 execution flow through the altered indirection cell to a synchronization point 218. In some cases, the process synchronizes 328 the diverted thread with a kernel 134 at the synchronization point. In some, the process performs 330 a garbage collection synchronization operation. In some embodiments, synchronizing 328 the thread with a kernel implicitly omits 334 operating system support for forcibly modifying one thread's execution context from another thread, as loop diversion occurs in the absence of such support.

In some embodiments, processor register 338 use is preserved, in the following sense. Assume that the loop body has a bottom. The steps of diverting 320 execution flow through the altered indirection cell to a point away from the loop top and restoring 322 the loop top address into the indirection cell are performed in these embodiments without restricting which registers 338 remain valid across successive transitions from the loop body bottom to the loop top. That is, these embodiments avoid 336 making restrictions on register use to accommodate diversion.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (as opposed to propagated signal media). The storage medium which is configured may be in particular a removable storage medium 114 such as a CD, DVD, or flash memory. A general-purpose memory, which may be removable or not, and may be volatile or not, can be configured into an embodiment using items such as indirection cells 210, diversion loop jump sequences 208, and redirection target codes 214, in the form of data 118 and instructions 116, read from a removable medium 114 and/or another source such as a network connection, to form a configured medium. The configured medium 112 is capable of causing a computer system to perform process steps for transforming data through loop diversion as disclosed herein. FIGS. 1 through 3 thus help illustrate configured storage media embodiments and process embodiments, as well as system and process embodiments. In particular, any of the process steps illustrated in FIG. 3, or otherwise taught herein, may be used to help configure a storage medium to form a configured medium embodiment.

Additional Examples

Additional details and design considerations are provided in several subsections below. As with the other examples herein, the features described may be used individually and/or or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

In some embodiments, loop diversion may be considered a form of loop hijacking, resembling thread hijacking in some aspects, but also differing from thread hijacking in mechanisms, assumptions, alternatives, and other aspects.

With the foregoing context in mind, consider now in turn a brief overview of a problem addressed by loop hijacking, a brief description of a Microsoft® Common Language Runtime solution to this problem, and an alternative solution. This discussion is not intended to be a complete history nor complete analysis of the problem space. Readers familiar with Common Language Runtime (CLR) garbage collector information can skip ahead to the "Loop Hijacking Overview" section.

A Brief Overview of Garbage Collector (GC) Suspension

Like the CLR, some target systems stop all threads before performing a garbage collection. Such systems deal with the same tricky sub-problem that the CLR has to deal with, namely, how to arrange for tight loops to be interruptible in a timely manner. Without addressing this problem, a tight loop running on one thread could starve the other threads by preventing further allocations on those threads.

In this discussion, it will be taken for granted that return address hijacking is possible, and that exception handling honors those hijacks. With return address hijacking, all call returns become points at which we can gain control of a thread. A thread can't recurse indefinitely without overflowing its stack, so that leaves call-free (a.k.a. "small" or "long-running") loops as places where a thread may run for a long time without any means for interrupting it. Naively, we might simply insert code into these loops that would check to see if the GC would like to run and stop the thread if it is. But this check ends up being costly relative to the size of the loop because most call-free loops end up being very small. Most of the time, all this checking to see if the GC would like to run is wasted effort because the GC runs infrequently. In other words, this solution has the undesirable property that it costs the most when it isn't needed.

Ideally, we would not change the code in the loop at all and, instead, arrange some manner of "on the side" data that will allow us to describe such loops so that we could gain control of them and still have perfect knowledge of all live object references that the loops might be manipulating, particularly enregistered ones. Thus was born "fully interruptible code", the solution used by the CLR.

Fully Interruptible Code

"Fully interruptible code" as used herein refers to code for which we record the location of all object references at each instruction offset. This record is known as fully interruptible GC info and it theoretically provides the right properties, in that the info is only needed when a call-free loop is identified and normal execution of the loop is not impacted by the requirement to be stoppable by the GC. The fully interruptible GC info is clearly verbose by nature, but it need only be consulted at GC time.

Loop Hijacking Overview

In some aspects, this approach resembles the naïve check-and-see implementation described above. It adds code to the loops of interest that will allow the GC to gain control of these loops. As such, it still has the undesirable property that it adds normal-execution cost (all the time) in order to handle the rare case of suspending for GC during the loop. But the cost of the proposed codegen changes can likely be small. As a bonus, this approach has better image size characteristics and better GC-time performance than the current CLR's fully interruptible code.

A basic idea is to allow hijacking of a loop's back-jump, which in hindsight is reminiscent of the way we hijack a return address on the stack. We transform back-jumps this way:

jmp rel8/rel32 (2 or 5 bytes)→jmp[target_indirection_cell] (6 bytes)

jcc rel8/rel32 (2 or 6 bytes)→jcc $+6 (with reversed cc) (2 bytes) jmp [target_indirection_cell] (6 bytes)

This transformation adds six bytes of code in the worst case. Each jump target has its own indirection cell 210 in the writable data section of the module 122 image as well as an entry in a reference jump target table in the read-only section of the image. These cells 210 are sorted by target address 206 so that when the kernel runtime sees that a thread is executing in a particular method 402, it can use the method's address range to find all jump targets within that method and set them to the address of some code 214, 502 that will cause the thread to synchronize with the GC.

As with return address hijacking, a thread may call to another function without hitting the loop hijacks, so the GC thread may continue to move these hijacks deeper in the callstack in the same way that it does with its return address hijacks in an effort to catch the thread sooner. This is discussed in more detail in the GC Suspension Synchronization section.

A target indirection cell should be able to get back to its original jump target after it has been hijacked. However, this isn't as simple for loop hijacking as it is for return address hijacking, because we don't know which loop a thread might be running in. We therefore hijack (divert 320) all loops in the method and the thread may hit any one of them. Accordingly, the thread calculates, via its own execution, which target it was headed to prior to the hijack.

We also insert some thunks 502 to serve as the slow path targets for the loop back-jumps. These thunks calculate data we can use to recover (restore 322) the original jump target. In some embodiments, the thunks are grouped together into bundles 222 as described in the Redirected Target Thunk Code section.

An indirection cell 210 index calculated by the redirected target thunks is used in an identifier 224 to lookup the original indirection cell value in an original targets table (an example of original value storage locations 212). In some embodiments, the original targets table contains compressed addresses 206, that is, encodings which represent the addresses 206. This compression format is described in the Original Target Table Format section.

In some embodiments, familiar GC liveness information 226 is calculated and stored for the jump target address. For some embodiments using an intermediate language in which offsets and addresses are denoted symbolically in compiler generated code and later resolved to numeric values by a binder that generates executable code, a GC_PROBE intermediate language pseudo-instruction is present at the jump target in order to inform the binder that this back-jump transformation should be done.

A downside to this mechanism is the introduction of private pages for the modified jump target indirection cells 210. Given that these cells are densely packed, however, the cost may be considered acceptable. Further techniques may be pursued if these private pages become a concern, such as reducing the number of these hijackable jumps in the generated code.

Redirected Target Thunk Code

The process of hijacking a loop 200 involves setting (altering 318) the loop's corresponding indirection cell 210 to a new value. This new value is the address of a thunk 502 which will pass along an identifier 224 (in the form of an index and a module handle) to a common runtime routine 220 that performs the wait for the GC to complete. In some embodiments, these thunks are grouped together into bundles 222 and then four bundles are grouped to make up a chunk. This bundled arrangement allows us to use the "push imm8" and "jmp rel8" instructions in the per-indirection-cell code, which allows the thunks to be quite small.

In some embodiments, the redirection target code 214 format accordingly looks like the following. Labels have been shortened here for promote legibility while conforming with patent document requirements; "cc" stands for "chunk_common", "ci0: stands for "chunk_index_0", "b0c" stands for "bundle0_common", and so on:

```
Chunk Code
cc:      68 xx xx xx xx    push    imm32 (starting index of chunk)
         68 xx xx xx xx    push    imm32 (module identifier)
         FF 25 xx xx xx xx jmp     [__imp_CommonLoopHijackHelper]
Bundle 0
ci0:     6A 00             push    0
         EB 7C             jmp     b0c
ci1:     6A 01             push    1
         EB 78             jmp     b0c
         ...
ci31:    6A 1F             push    31
         EB 00             jmp     b0c
b0c:     E9 xx xx xx xx    jmp     cc
ci32:    6A 20             push    32
         EB F9             jmp     b0c
ci33:    6A 21             push    33
         EB F5             jmp     b0c
         ...
ci62:    6A 3E             push    62
         EB 81             jmp     b0c
Bundle 1
    [chunk indicies 63-125]
Bundle 2
    [chunk indicies 126-188]
Bundle 3
    [chunk indicies 189-251]
```

This bundled arrangement allows us to pack 252 thunks into 1033 bytes. The CommonLoopHijackHelper combines the particular chunk index with the starting index of the chunks to get an index into the given module's array of indirection cells. This index in turn allows the common code routine 220 to return the thread back to the loop 200 from which it came, after the GC completes.

GC Suspension Synchronization

As mentioned earlier, it is possible for a thread to continue nesting while thread suspension is attempting to gain control of it. Therefore, some embodiments chase the thread down its callstack, continuing to apply loop hijacks (diversions) on the new methods that the thread enters, until it yields control.

A complication arises, however, due to the fact that loop hijacks are applied to a shared memory location; the loop indirection cell 210 is shared among all threads 124 potentially running the associated loop code. This aspect of loop hijacking differs from return address hijacking, which modifies thread-local memory (i.e. the thread's stack). When return address hijacking, it is valid to simply move the hijack from one stack location to another when chasing a thread, but this is very difficult to accomplish with loop hijacking because multiple threads may be executing in the same method when we chase just one of them further into the callstack.

Some embodiments accordingly keep the suspend phase limited to simply turning on loop hijacks. That is, some embodiments do not disable a loop hijack by restoring 322 indirection cell content, until after all threads have synchronized with the runtime. Then all cells 210 are restored at once.

One way to accomplish this uses a hijacked cell bitmap, which is generated into the module's data section. A given bit represents a group of loop indirection cells 210, of a tunable size, in order to reduce the size of the bitmap. Whenever we wish to hijack one cell, we hijack all of the cells in that cell's group and then set the corresponding bit in the bitmap to one. Later we consult the bitmap find which cells 210 need to be reset (restored 322).

Original Target Table Format

The grouping of indirection cells 210 for the purposes of reducing the size of the hijacked cell bitmap lends itself to a compact encoding for the original target table (original value storage locations 212). The format of this table takes advantage of our existing compressed integer encoding. The first part of this table contains a series of variable-length unsigned integers which represent the offset from the beginning of the table to the corresponding group descriptor, which encodes the original jump target address 206 for every indirection cell 210 in a group. The second part of this table is the group descriptors themselves. A group descriptor starts with a variable-length unsigned integer that is the offset from the beginning of the code section to the first branch target in the group. The remaining variable-length unsigned integers are delta values which, when accumulated, give the original code offsets for each indirection cell in the group. For example, if a group descriptor had a series of {2000, 20, 10, 30, 5, 10}, the original targets for the group would be {2000, 2020, 2030, 2060, 2065, 2075}. Due to the properties of the variable-length unsigned integer, smaller numbers take less space, so this kind of accumulation leads to a more compact encoding.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIG. 3 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A process for loop control flow diversion, the process utilizing a device which has at least one logical processor in operable communication with at least one memory, the logical processor having at least one register, the process comprising the steps of:
    obtaining in the memory an executable module which includes a loop having a loop body which is not fully interruptible code and does not consist of nops, the loop also having a loop top, the module also including an indirection cell containing a loop top address, namely, an address pointing to the loop top, the loop also including a loop jump instruction sequence which references the indirection cell;
    a first thread of execution executing an iteration of the loop body;
    continuing execution flow of the first thread through the address specified in the indirection cell to the loop top;
    a second thread of execution altering the contents of the indirection cell such that the indirection cell contains an address other than the loop top address;
    diverting execution flow of the first thread through the altered indirection cell to a point away from the loop top, said diverting step not reliant upon a repeat count register of the processor;
    restoring the loop top address into the indirection cell; and
    again continuing execution flow of the first thread through the restored indirection cell to the loop top.

2. The process of claim 1, wherein multiple threads execute the loop body, and the process comprises diverting execution flow of all threads that execute the loop body through the altered indirection cell to a point away from the loop top.

3. The process of claim 1, wherein the loop is a first loop, the first thread also executes a second loop, the second loop has a respective second loop body and a respective second loop top, the module also includes a second indirection cell containing a second loop top address pointing to the second loop top, the second loop also includes a second loop jump instruction sequence which references the second indirection cell, and the process comprises diverting execution flow of the first thread through an altered second indirection cell of one of the loops to a point away from that loop's top.

4. The process of claim 1, wherein the step of altering the indirection cell (such that the indirection cell contains an address other than the loop top address) is atomic with respect to all threads of execution in the device.

5. The process of claim 1, wherein the diverting step diverts execution flow through the altered indirection cell to a synchronization point, and the process further comprises synchronizing the thread with a kernel at the synchronization point.

6. The process of claim 1, wherein the diverting step diverts execution flow through the altered indirection cell to a synchronization point, and the process further comprises then performing a garbage collection synchronization operation.

7. The process of claim 1, wherein the memory includes a plurality of indirection cells allocated during code generation for a respective plurality of loops, and the process further comprises noting which indirection cell(s) are altered.

8. The process of claim 1, wherein the process comprises synchronizing the thread with a kernel, in the absence of operating system support for forcibly modifying one thread's execution context from another thread.

9. The process of claim 1, wherein the loop body has a bottom, and the steps of diverting execution flow through the altered indirection cell to a point away from the loop top and restoring the loop top address into the indirection cell are performed without restricting which registers remain valid across successive transitions from the loop body bottom to the loop top.

10. The process of claim 1, wherein the first thread and the second thread are each managed by a virtual execution system.

11. A computer-readable storage medium configured with data and with instructions that when executed by at least one processor causes the at least one processor to perform a process for facilitating loop control flow diversion, the process comprising the steps of a code generator:
    providing a loop having a loop body which is not fully interruptible code and does not consist of nops, the loop also having a loop top, an iteration of the loop body executable by a first thread of execution to continue execution flow of the first thread through an address specified in an associated indirection cell to the loop top;
    designating an original value storage location which is sized to hold a representation of the loop top address; and
    wherein a second thread is executable to alter the contents of the indirection cell such that the indirection cell contains an address other than the loop top address, diverting execution flow of the first thread through the altered indirection cell to a point away from the loop top, said diverting step not reliant upon a repeat count register of the processor, then restoring the loop top address into the indirection cell, with execution flow of the first thread continuing through the restored indirection cell to the loop top.

12. The configured computer-readable storage medium of claim 11, wherein the process further comprises the code generator outputting garbage collector liveness information for the loop top.

13. The configured computer-readable storage medium of claim 11, wherein the process comprises the code generator associating a plurality of indirection cells with a plurality of respective loop tops, designating a plurality of respective original value storage locations, and emitting a plurality of respective redirection target codes.

14. The configured computer-readable storage medium of claim 11, wherein the step of designating an original value storage location which is sized to hold a representation of the loop top address comprises the code generator designating an original value storage location which is smaller than the indirection cell for at least some of the loop top addresses.

15. The configured computer-readable storage medium of claim 11, comprising the code generator emitting code which upon execution will pass an indirection cell identifier to a specified kernel routine.

16. A computer system comprising:
   a logical processor which is not tailored for specific use as a flash storage controller;
   a memory in operable communication with the logical processor;
   an executable module residing in the memory, the executable module including a plurality of loops each having a respective loop body which is not fully interruptible code and does not consist of nops, each loop also having a respective loop top, the module also including a plurality of indirection cells each containing a respective loop top address, namely, an address pointing to a respective loop top, each loop also including a respective loop jump instruction sequence that includes a jump to an address contained in the respective indirection cell;
   a plurality of respective original value storage locations residing in the memory, each of which is sized to hold a representation of the respective loop top address; and
   a plurality of respective redirection target codes residing in the memory, each of which upon execution will pass control to a single shared redirection processing routine;
   wherein the system includes software whose execution includes a first thread of execution executing an iteration of the loop body, continuing execution flow of the first thread through the address specified in the indirection cell to the loop top, a second thread of execution altering the contents of the indirection cell such that the indirection cell contains an address other than the loop top address, diverting execution flow of the first thread through the altered indirection cell to a point away from the loop top, said diverting step not reliant upon a repeat count register of the processor, restoring the loop top address into the indirection cell, and again continuing execution flow of the first thread through the restored indirection cell to the loop top.

17. The system of claim 16, further comprising a virtual execution system having code which may employ a thread to modify indirection cells and hence divert loops of other threads to a redirection processing routine specified by the virtual execution system.

18. The system of claim 16, wherein the redirection processing routine includes code which upon execution will perform a garbage collection synchronization operation.

19. The system of claim 16, further comprising code which upon execution will track for the virtual execution system which indirection cells have been modified.

20. The system of claim 16, wherein the redirection target codes are grouped together in bundles.

* * * * *